Nov. 21, 1950     H. W. PROTZELLER     2,530,589
TAKE-OFF MECHANISM
Filed Nov. 21, 1947     6 Sheets-Sheet 1
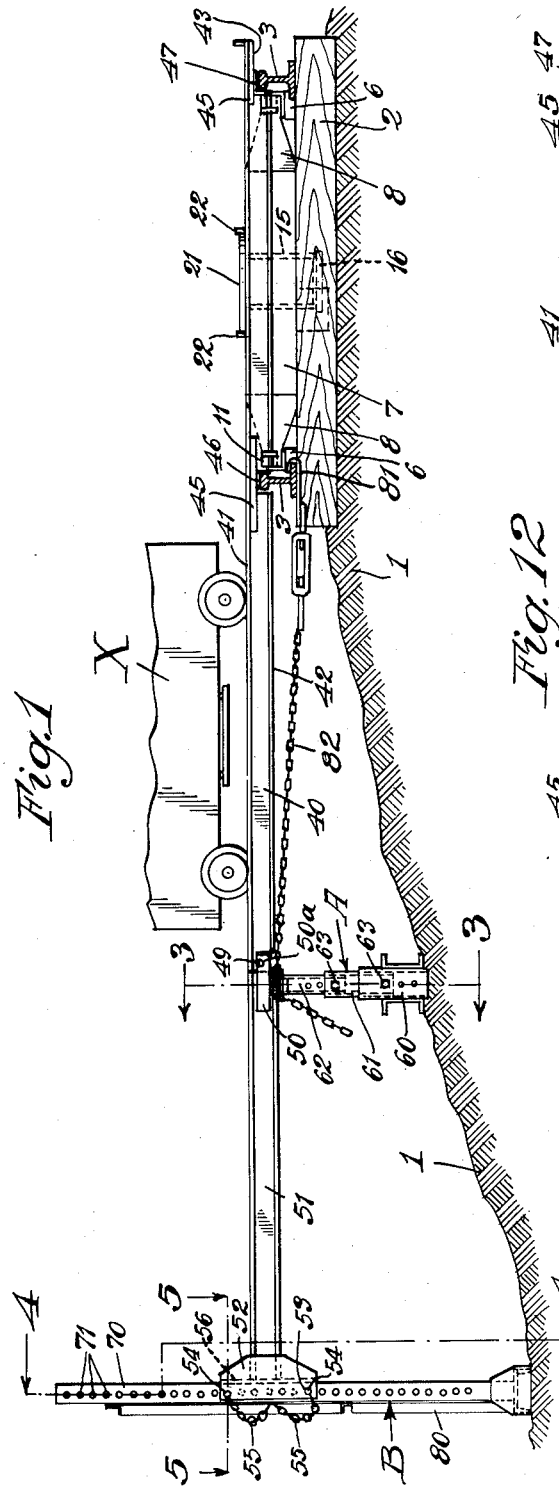
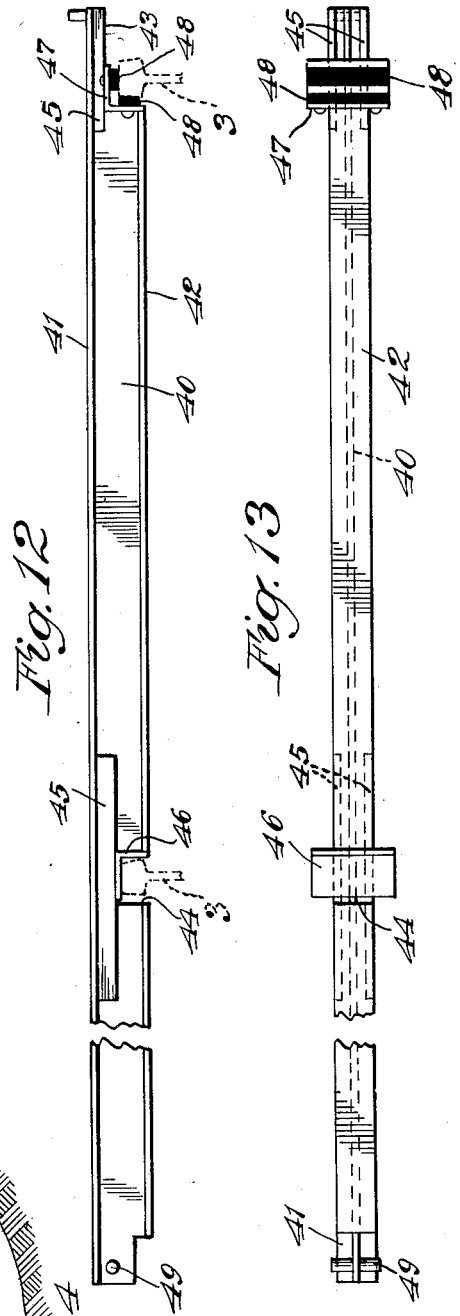
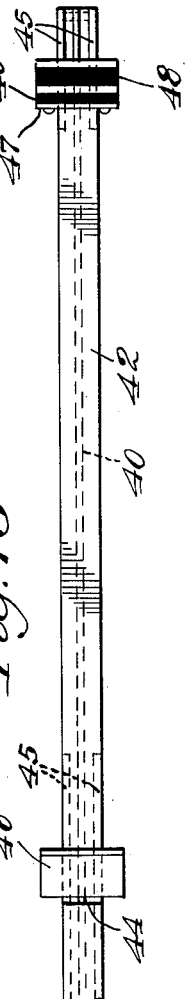
Inventor
Harry W. Protzeller
by Parker & Carter
Attorneys

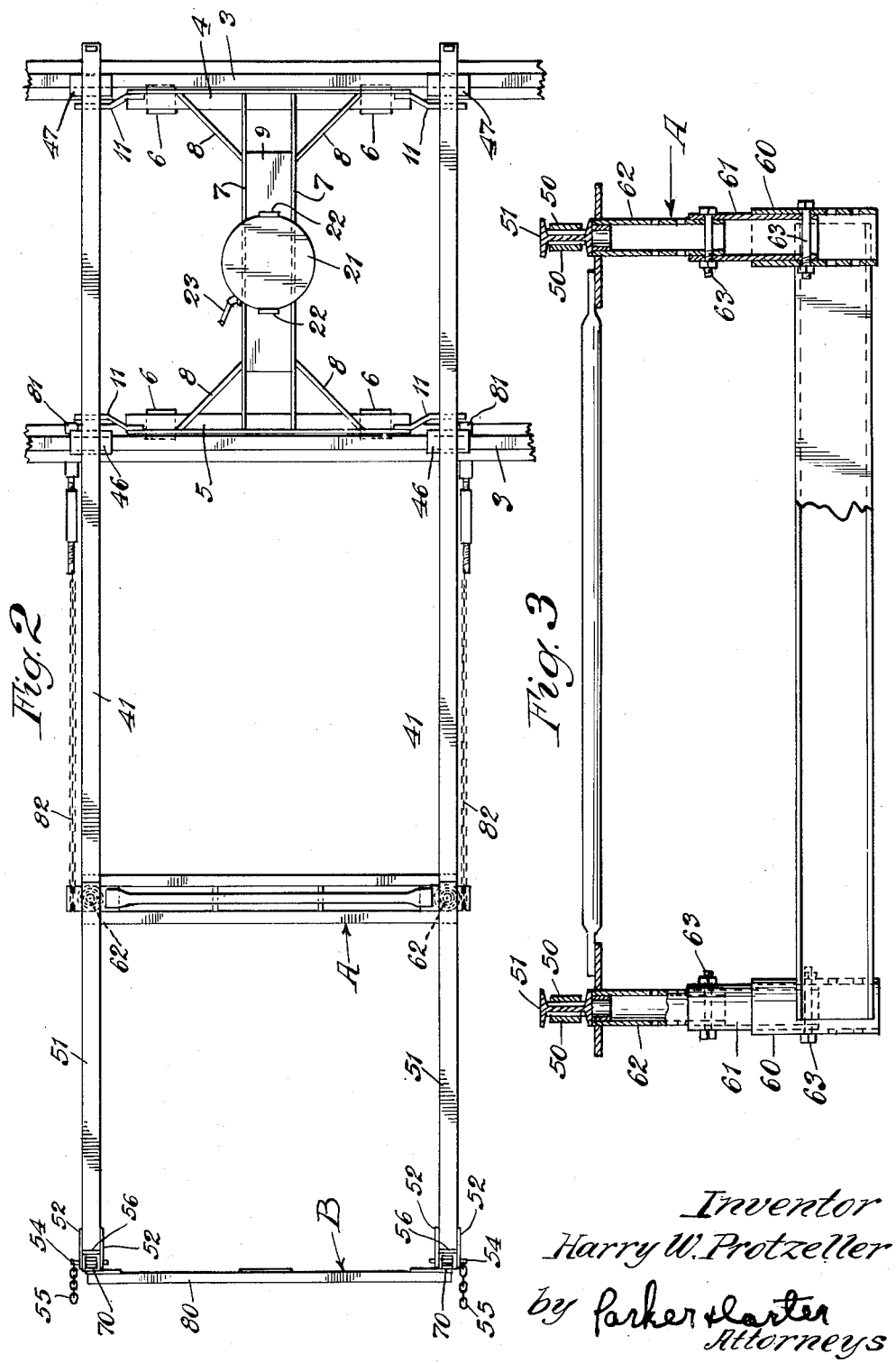

Nov. 21, 1950 H. W. PROTZELLER 2,530,589
TAKE-OFF MECHANISM
Filed Nov. 21, 1947 6 Sheets-Sheet 3
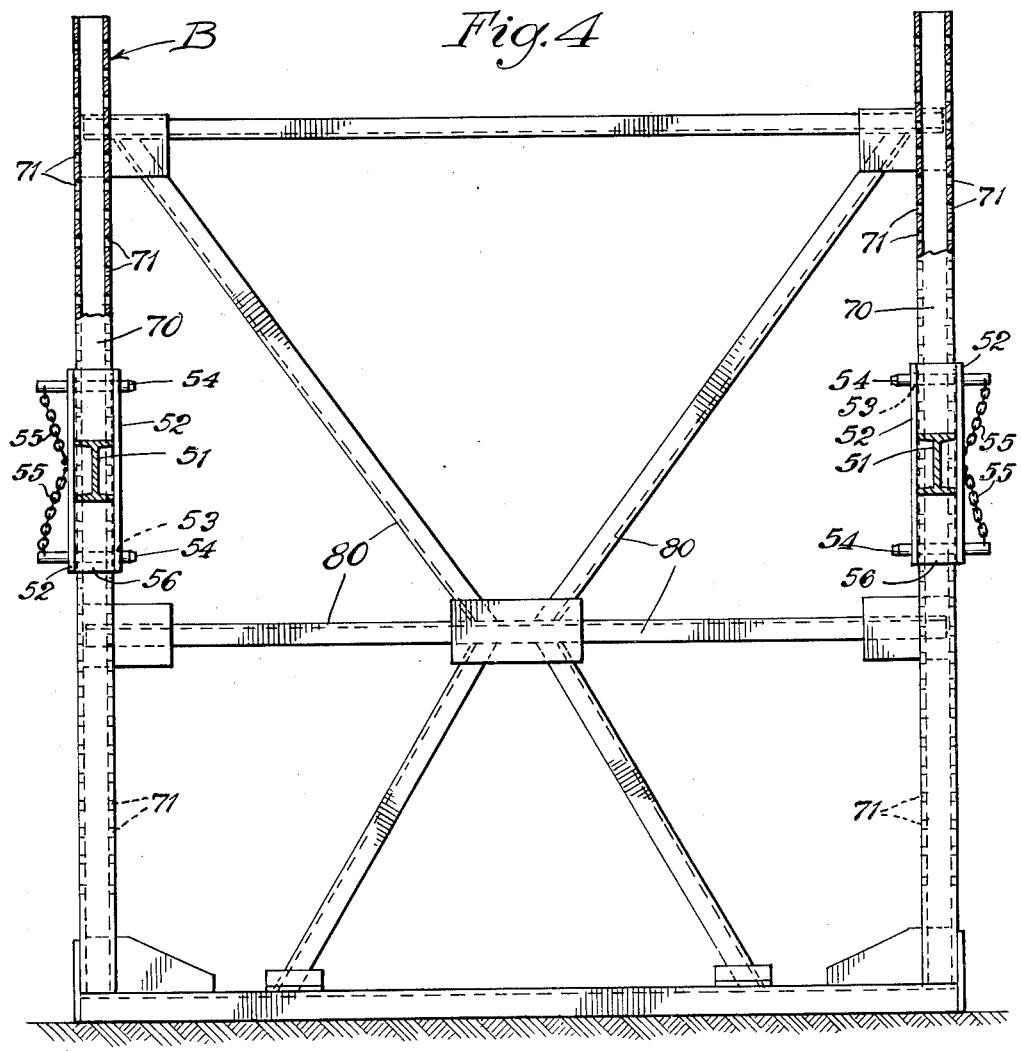
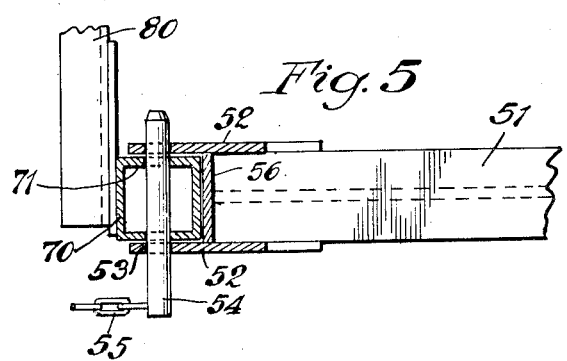
Inventor
Harry W. Protzeller
by Parker & Carter
Attorneys

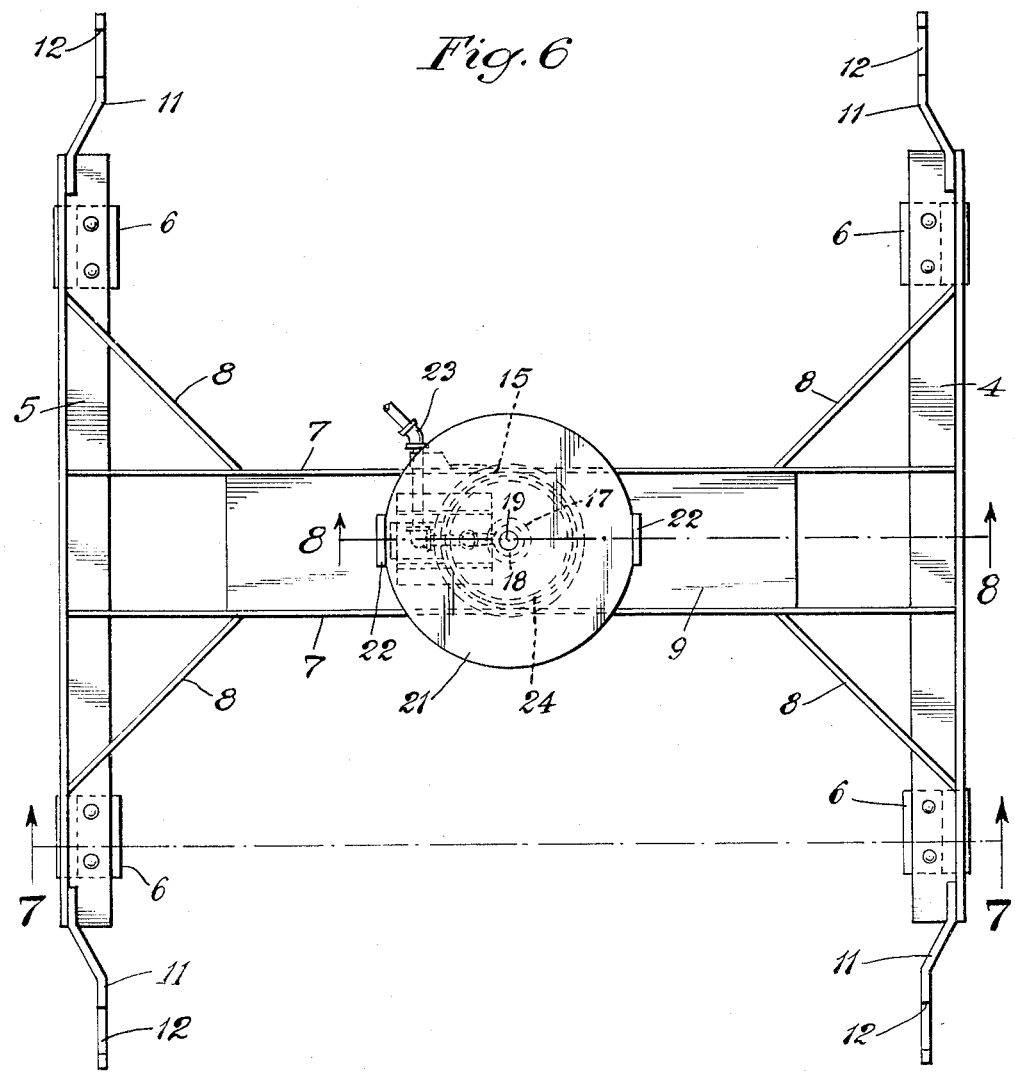

Nov. 21, 1950 H. W. PROTZELLER 2,530,589
TAKE-OFF MECHANISM
Filed Nov. 21, 1947 6 Sheets-Sheet 5
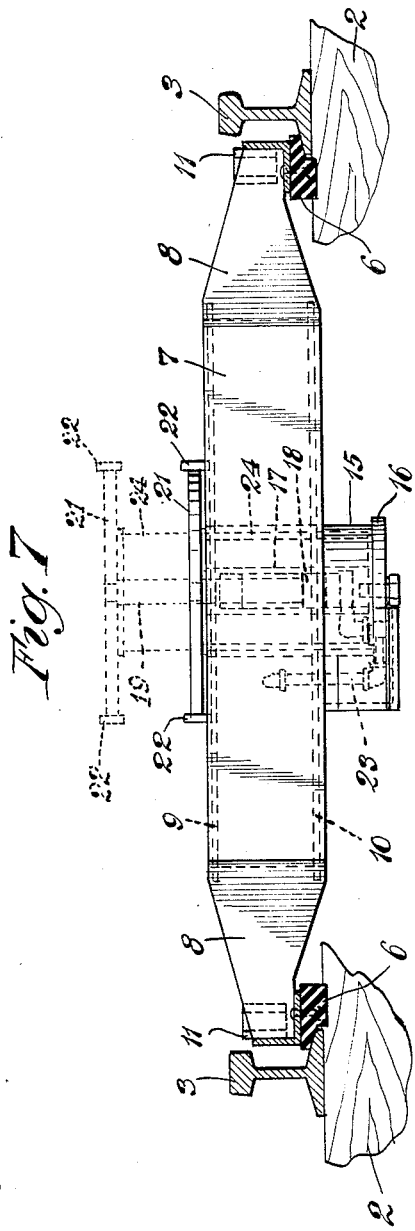
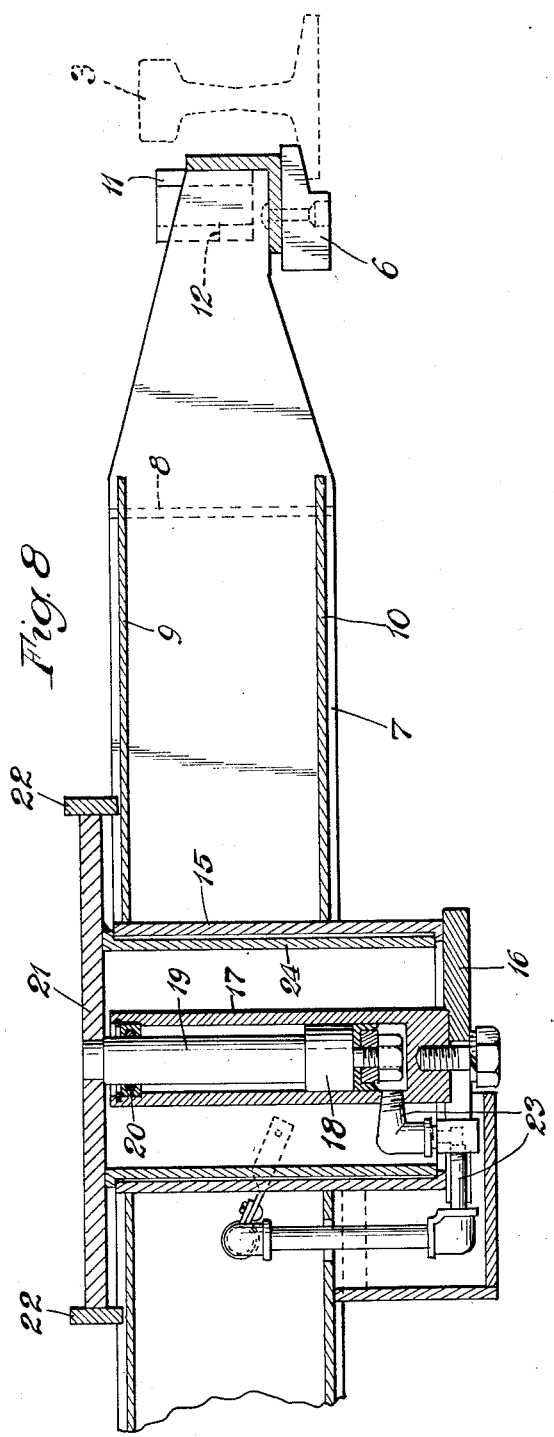
Inventor
Harry W. Protzeller
by Parker & Carter
Attorneys Nov. 21, 1950     H. W. PROTZELLER     2,530,589
TAKE-OFF MECHANISM Filed Nov. 21, 1947     6 Sheets-Sheet 6

Inventor
Harry W. Protzeller
by Parker & Carter
Attorneys

Patented Nov. 21, 1950

2,530,589

UNITED STATES PATENT OFFICE 2,530,589

TAKE-OFF MECHANISM

Harry W. Protzeller, Milwaukee, Wis., assignor to Nordberg Manufacturing Company, Milwaukee, Wis., a corporation of Wisconsin Application November 21, 1947, Serial No. 787,319

8 Claims. (Cl. 104—45)

My invention relates to an improvement in take-off devices available for railroad use, and has for one purpose to provide means for readily and quickly removing heavy track working equipment from the rails of a track, to permit the passage of trains.

Another purpose is to provide improved take-off means for the removal of rail-supported track working equipment.

Another purpose is to provide take-off means which include rails for supporting the equipment after it has been removed from the rails of a track.

Another purpose is to provide an improved take-off means which needs a minimum number of men to operate it.

Another purpose is to provide a take-off means of minimum weight and cumbrousness.

Other purposes will appear from time to time in the course of the specification and claims.

I illustrate the invention more or less diagrammatically in the accompanying drawings wherein:

Fig. 1 is a side elevation, with the rails of the track in transverse section;

Fig. 2 is a plan view;

Fig. 3 is a section on the line 3—3 of Fig. 1;

Fig. 4 is a section on the line 4—4 of Fig. 1;

Fig. 5 is a section on the line 5—5 of Fig. 1;

Fig. 6 is a partial plan view on an enlarged scale;

Fig. 7 is a section on the line 7—7 of Fig. 6;

Fig. 8 is a section on an enlarged scale on the line 8—8 of Fig. 6;

Fig. 12 is a side elevation of another rail take-off element; and

Fig. 13 is a bottom view of the element shown in Fig. 12.

Like parts are indicated by like symbols throughout the specification and drawings.

Figure 9:
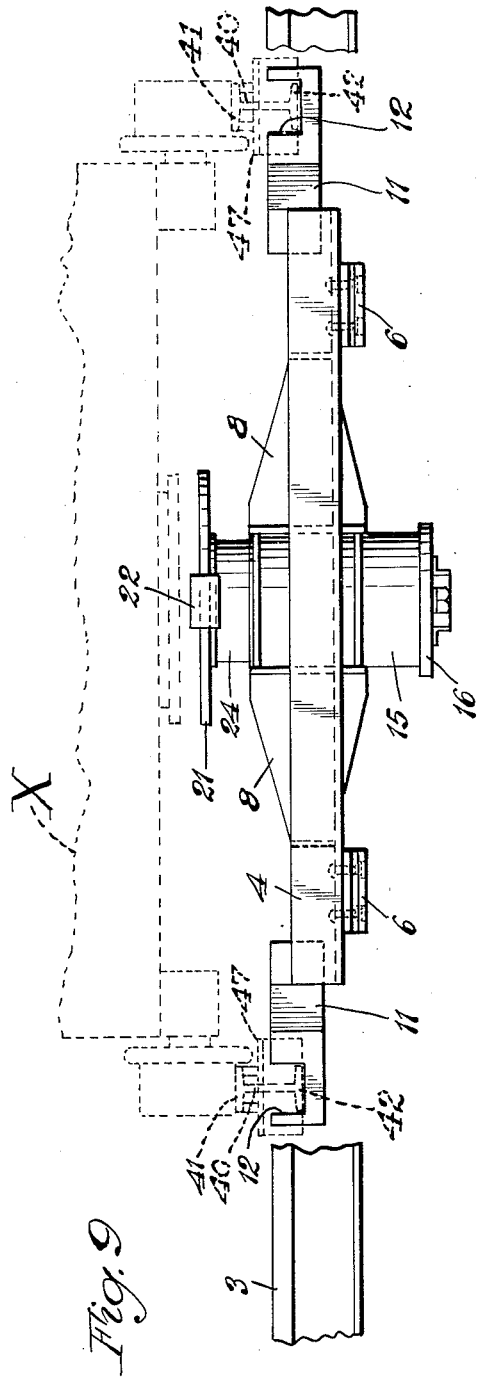
Fig. 9 is a partial side elevation illustrating the parts in inoperative position.
Figure 10:
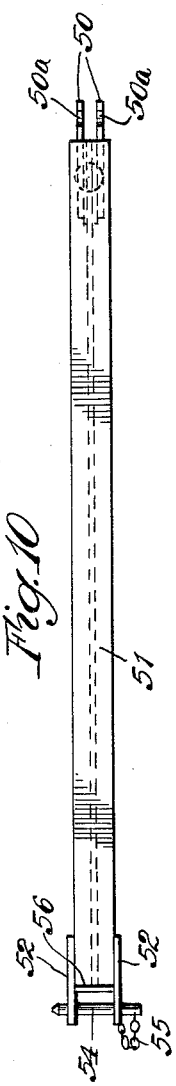
Fig. 10 is a plan view of a take-off rail.
Figure 11:
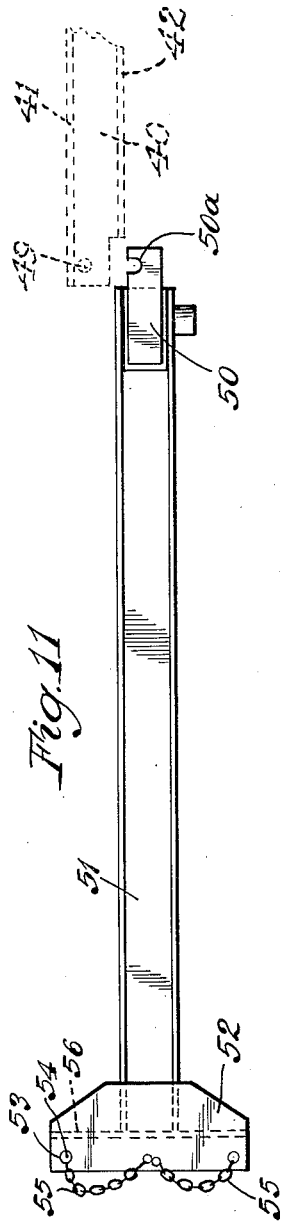
Fig. 11 is a side elevation of the structure of Fig. 10.

Referring to the drawings, 1 generally indicates the ground along the right-of-way. 2 indicates a tie and 3, 3 track rails secured to the tie. Movably and removably mounted between the rails 3 is an elevator base. As shown in Figs. 6, 7 and 8, such base includes opposite side angle elements 4 and 5 to which are secured insulating base blocks 6. Extending between the side angles 4 and 5 is a cross structure having side members 7 and braces 8, a top plate 9 and a bottom plate 10. Mounted on the ends of the angles 4, 5 are centering brackets 11 upwardly notched as at 12. It will be noted that the side angles are inwardly bent at their end portions, which are therefore spaced somewhat inwardly from the track rails.

Extending between the top and bottom plates 9 and 10 of the cross member, and secured to the side members 7 is the sleeve 15 which carries at its lower end a plate 16 which supports a cylinder 17 in which is positioned a piston 18. The piston rod 19 extends up through any suitable packing 20 and supports an elevator disk or plate 21 shown as having diametrically opposed stops or centering members 22. 23 is any suitable pressure inlet or duct through which a suitable fluid may be admitted below the piston 18 in order to raise the plate 21 from the full line to the dotted line position of Fig. 7. The plate 21 also carries a telescoping sleeve 24 which rides within the sleeve 15. It will be understood that any suitable source of fluid pressure may be applied together with any suitable control means therefor, not herein shown.

It will be understood that the above described assembly can be positioned by a work crew at any desired point along the rail of the track, a sufficient clearance along the right-of-way being made to receive the lower end of the sleeve 15 and its plate 16, which extend into the right-of-way between a pair of adjacent ties. Note, as in Figs. 7 and 8, that the blocks 6 are so placed that the ends of the cross-piece clear the inner faces of the top flanges of the rails 3. There is thus no interference with the wheels of the cars of passing trains.

Assuming that a train is coming and it is desired to remove a heavy piece of equipment, I provide a take-off rail system to receive the equipment to be removed. As shown in Figs. 2, 12 and 13, I provide individual cross rails, each of which is in the form of an I beam with the vertical flange 40, a top flange 41 and a bottom flange 42. I illustrate an end cut-away portion 43, an intermediate cut-away portion 44 and reinforcements 45 for the top flange 41 at the cut-away portions. I also employ rail-engaging angle additions 46, 47, of which one is provided with insulating blocks 48. It will thus be clear that the take-off rails can be dropped on the top of the track rails, in the position in which they are shown in Figs. 1 and 12, the take-off rails being received in and spaced by the top notches 12 of the guides 11 above described. This will be clear as in Fig. 9. The ends of the take-off rails have cross pins 49 adapted to be received in notches 50a in securing plates 50 which are secured to the end of terminal or continuing take-off rails 51. The rails 51 have spaced parallel vertical end plates 52 provided with apertures 53 to receive holding pins 54 secured to retaining chains 55. 56 is a vertical reinforcing guiding plate between the parallel plates 52.

Any suitable means may be employed for securing or supporting take-off rails. I illustrate, for example, an intermediate and vertically adjustable support A and the outer and vertically adjustable support B. The support A is illustrated generally in Fig. 3 and includes telescopic members 60, 61 and 62 with adjusting and securing bolts 63. The support B is shown in Fig. 4 and includes vertical square uprights 70 apertured along the sides as at 71 to receive the securing pins 54. As will be clear from Fig. 5 the parts are so proportioned that the side plates 52 embrace the square vertical supports 70. Thus the run-off or take-off rails can be adjusted at any desired level. Any suitable bracing structure generally indicated as 80 may be employed. If desired, the intermediate support A may be anchored to the rail as by a hook 81 and the chain 82.

It will be realized that whereas I have described and claimed a practical and operative device, nevertheless many changes may be made in size, shape, number and disposition of parts without departing from the scope of my invention.

The use and operation of my invention are as follows:

Track working equipment of substantial weight may be used on railroad tracks and may be supported and conveyed along the rails of a railroad track. As examples, I may mention cribbing machines and other machines which operate on the ballast or along the right-of-way of a railroad track. It is frequently important to remove such equipment. A problem is presented by the fact that while the equipment may be heavy, the operating crew may be small in numbers, and the equipment may be used at points removed from railroad cranes or overhead handling material. The structure herein shown can be assembled and operated quickly and efficiently by a small crew. The basic member or elevator which goes between the rails of a railroad track, as shown, for example, in Figs. 7 and 8, is of such weight that it can be easily handled by two or at the most three men. All of the other elements are substantially lighter and are formed for easy handling and for quick adjustment. The heaviest element, which goes between the rails, is so formed and proportioned, that it can be left in place during the passage of a train. Assuming that the crew wishes to move the unit, the take-off or cross rails shown in Figs. 10, 11, and 12, 13, are dropped in the position in which they are shown in Fig. 1, and are secured to the properly adjusted supports A and B. The equipment to be removed is previously spotted over the elevator and an appropriate lower portion thereof is engaged by the lifting or elevator plate 21 and the centering members 22. Pressure is admitted through the duct 23, resulting in the elevation of the equipment in question. It is then rotated until its wheels are vertically aligned with the supplemental or take-off rails. It is then moved outwardly, as shown in Fig. 1, and may be parked outwardly close to the end support B. The inner take-off rails, which actually span the track rails 3 are then removed. This is a quick operation, since all that is necessary is to lift them upwardly, and they are of such weight as to be capable of being handled by a single man. The equipment is then supported outwardly away from the track and when the train goes by, the previously removed take-off rails can be replaced and the equipment, shown at X in Fig. 1, can be returned to the track rails.

I claim:

1. In a take-off mechanism for track-working equipment, including vehicles having flanged wheels, a readily removable base formed and adapted to span the space between the two rails of a railroad track, said railroad track rails being adapted to receive the flanged wheels of such vehicles, a turntable on said base, an elevating mechanism for said turntable adapted to elevate the turntable with a vehicle supported thereon, a run-off track structure positioned laterally of said railroad track, having rails of the general gauge of the track rails and of the said flanged wheels and removable rails adapted to span the space between said run-off track rails and the rails of the railroad track and formed to be applied and positioned after elevation and rotation of said turntable, said removable rails, when in vehicle receiving position, spanning and resting upon the rails of said railroad track, said turntable being formed and adapted to engage a part of the vehicle between the rails of the railroad track, said turntable being between said removable rails when said removable rails are aligned with said run-off track structure.

2. The structure of claim 1, characterized by and including a base removably centered between the rails of a track and formed and adapted to clear all parts of a passing train, whereby said base may safely be left in position during the passage of a train.

3. The structure of claim 1, characterized by and including a run-off track structure having longitudinally extensible supporting members adapted to support portions of said run-off track structure in substantially a common plane with said take-off rails.

4. The structure of claim 1, characterized by and including a run-off track structure having independently adjustable supports at each end, the support closest to the railroad track terminating below the wheel supporting surface of the rails of the run-off track structure.

5. The structure of claim 1, characterized by and including run-off rails formed and adapted to span the rails of the railroad track and having at one end laterally extending continuing portions of sufficient length to bridge the distance between the railroad track and the run-off track structure, said laterally extending portions being formed and adapted to be applied and positioned after elevation and rotation of the turntable.

6. The structure of claim 1, characterized by and including removable rails having downwardly extending portions adapted to enter the space between the rails of the railroad track, thereby to position the removable rails in a predetermined relation to the rails of the railroad track, said removable rails being formed and adapted to be applied and positioned after elevation and rotation of the turntable.

7. The structure of claim 1, characterized by and including insulating supporting connections between said removable rails and one of the rails of the railroad track.

8. In a take-off mechanism for track-working equipment, including vehicles having flanged wheels, a readily removable base formed and adapted to span the space between the two rails of a railroad track, said railroad track rails being adapted to receive the flanged wheels of such vehicles, a turntable on said base, an elevating mechanism for said turntable adapted to elevate the turntable with a vehicle supported thereon, a run-off track structure positioned laterally of said railroad track, having rails of the general gauge of the track rails and of the said flanged wheels, and removable rails adapted to span the space between said run-off track rails and the rails of the railroad track and formed to be applied and positioned after elevation and rotation of said turntable, said removable rails, when in vehicle receiving position, spanning and resting upon the rails of said railroad track, and including portions engaging in interpenetrating relationship with said base, said turntable being formed and adapted to engage a part of the vehicle between the rails of the railroad track, said turntable being between said removable rails when said removable rails are aligned with said run-off track structure.

HARRY W. PROTZELLER.

No references cited.